SIGNAL SOURCE RECORDING IDENTIFICATION SYSTEM

Filed June 9, 1966

INVENTOR.
Robert C. Franklin
William R. Boyd
BY
Flehr & Swain
Attorneys

July 1, 1969 R. C. FRANKLIN ET AL 3,453,645

SIGNAL SOURCE RECORDING IDENTIFICATION SYSTEM

Filed June 9, 1966 Sheet 2 of 2

INVENTOR.
Robert C. Franklin
William R. Boyd
BY Fehr and Swain
Attorneys

United States Patent Office 3,453,645

Patented July 1, 1969

3,453,645

SIGNAL SOURCE RECORDING IDENTIFICATION SYSTEM

Robert C. Franklin, San Jose, and William R. Boyd, Oakland, Calif., assignors to Beckman Instruments, Inc., a corporation of California Filed June 9, 1966, Ser. No. 556,348
Int. Cl. G01d *9/30*
U.S. Cl. 346—49 5 Claims

ABSTRACT OF THE DISCLOSURE

A system for identifying from among a plurality of signal sources the source providing the information being recorded in an information trace on a suitable record medium including a transducer for recording on the record medium alongside the information trace an index trace representing a predetermined repetitive quantity, such as time, occurring during the recording of the information trace. The system also includes means for selectively modifying the index trace in a predetermined manner so that the index trace gives an indication of the particular source from which the information is being derived in addition to giving a time reference against which the information may be compared. In particular, the index trace is modified by effectively combining successive pairs of the index marks provided in the index trace to form a predetermined number of elongated marks the number of which represents the signal source from which the information is being derived.

This invention relates to signal source recorders of a type, for example, such as strip chart recorders wherein a recorded information trace is provided to indicate the condition of a selected one of a plurality of signal sources. More particularly, the present invention relates to means and methods for identifying the particular selected source as it provides the recorded trace.

It is a general object of the present invention to provide improved source identification means for recorders of a type recording a trace representing conditions transduced from one of a plurality of sources.

It is another object of the present invention to provide a source identification system and method of operating recorders of a type wherein an index trace normally containing a pulse train recorded therein and positionally associated with an information trace can identify which of several sources originates the information trace, identification being made merely by varying the index trace thereof.

Another object of the invention is to provide apparatus of the kind described wherein notwithstanding varying of the index trace to combine normal index pulses to form indicia pulses, the identity of the normal index pulses is preserved.

These and other objects of the invention will become more readily apparent from the following detailed description of a preferred embodiment when considered in conjunction with the drawings.

Referring to the drawings.

Figure 1:
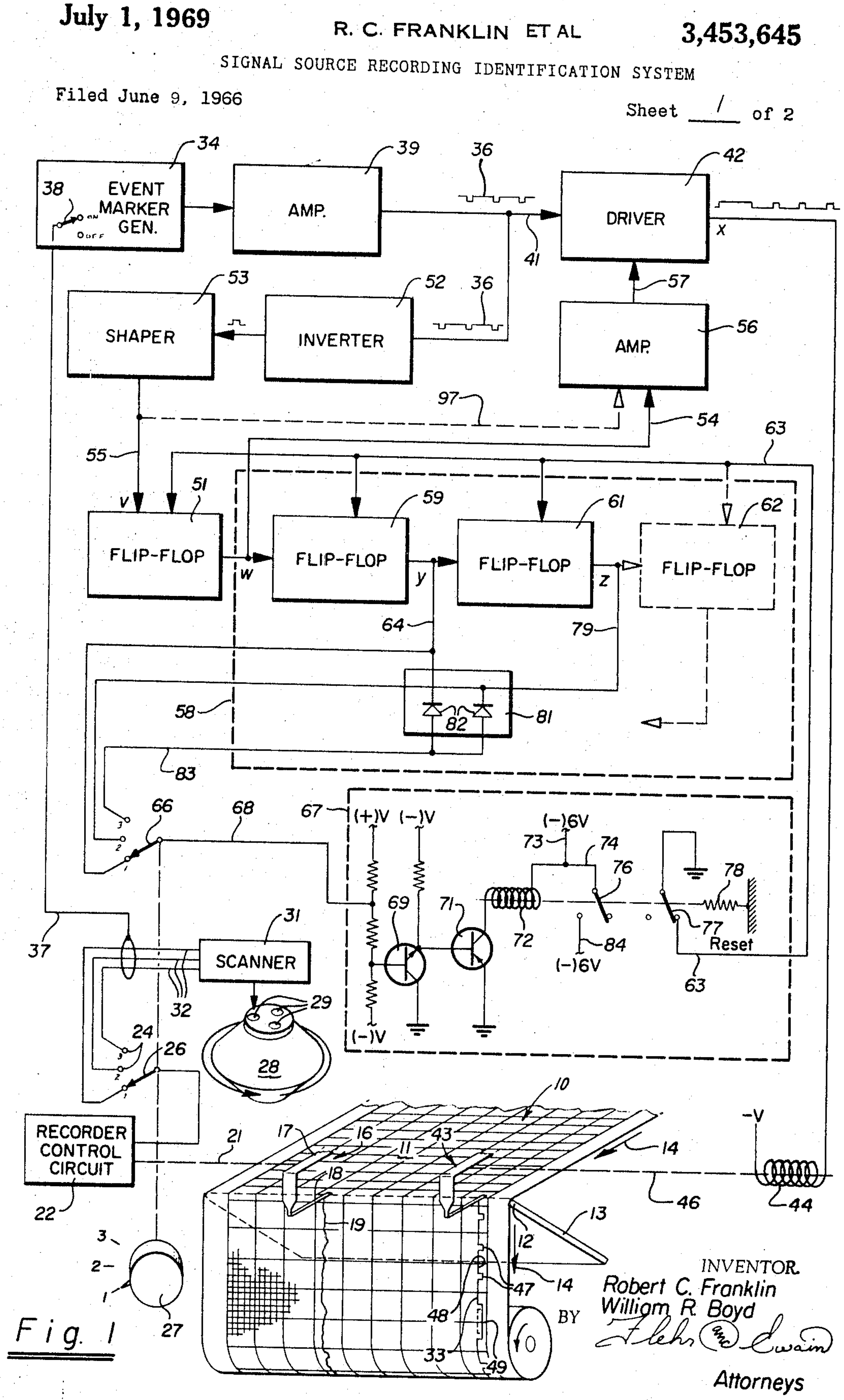
FIGURE 1 is a schematic diagram showing the system according to the invention.

In general, recording apparatus of the kind shown herein includes read-out means adapted to be selectively coupled to each of a plurality of signal sources for selectively reading out the condition of the selected source. Manifestations of the source conditions are recorded, ordinarily in the form of an analog trace along a web. The web is motor driven from a supply to a takeup roll. Normally, the web consists of graph paper of a pressure responsive or electric responsive type whereby the trace is formed either by locally applied pressure or by electric contact therethrough. Such apparatus may be of a type further having pulse forming means providing a train of pulses manifesting the occurrence of a series of "events" and an index trace recorder responsive thereto. The index trace recorder normally records a train of spaced marker pulses representative of the occurrence of each "event" thereby forming and index trace along the web and recorded in lateral relation to the source trace. In this manner, the relationship between each event and the condition of the source at that time may be determined by inspection.

An "event" can result from the elapse of time as in a timed pulse generator, the sensing of reference marks as in cyclically repeating clock tracks, or otherwise, such as in, scans made of a centrifuge cell.

Switch means serve to operatively couple the read-out means to receive signals derived from a selected one of the several "signal sources." Thus, such "signal sources" may include scanning mechanism for selecting and scanning a selected one of several cells of a rotating centrifuge rotor. Other sources of signals may include temperature responsive transducers located at several points on a device or structure. Other examples of forming several "signal sources" of transducible signals can include, for example, applications where optical density is being measured at various locations.

In general, to provide a system for identifying that selected one of the several sources of signals which is providing the information or source condition trace being recorded there is formed a system of the above kind further including a first counting means operatively responsive to the train of pulses representing the occurrence of a series of events. The first counting means applies periodic inhibit signals to the index recording means so as to inhibit formation of normal spacing between successive pulses of a train of markers laid down on the index trace. This inhibiting action is applied for successive short periods so as to provide discrete periods of abnormally spaced markers along the trace serving thereby to provide indicia to identify the source. For example, to indicate the identity of source #2, the index trace would include two periods of abnormally spaced markers. A second counting means, settable to a predetermined selected count representing the selected source which is being recorded, cooperates with the first counting means. Upon attainment of a predetermined selected count in the second counting means, the first counting means is conditioned to preclude further generation of the aforementioned inhibiting signals as applied previously to the index trace recorder. The first and second counting means cooperate to limit the number of those successive short periods wherein normal index marker formation is inhibited, to a number associated with the selected count in the second counting means.

A detailed description of the foregoing general arrangement proceeds as now to be described. A strip chart recorder 10 is schematically represented in FIGURE 1. One suitable strip chart recorder is manufactured by Offner Division of Beckman Instruments, Inc., Schiller, Park, Ill. as its Model R.S. strip chart recorder.

Recorder 10 includes a web 11 of pressure and heat sensitive graph paper whereby application of a point of pressure upon web 11 serves to develop a trace thereon.

Web 11 is draped across the edge of 12 of a support plate 13 and, by means not shown, is carried in the direction of arrows 14 across edge 12 to be rolled to form a takeup roll.

A stylus assembly 16 includes the support leaf 17 which carries a yieldingly mounted stylus member 18 carried in contact with the surface of web 11 at that point where it crosses edge 12 of plate 13. Thus, stylus member 18 applies local pressure to web 11 as it crosses edge 12 and forms a read-out trace 19 indicative of the condition of one source of signals being transduced. Stylus assembly 16 is movable laterally of web 11 by a mechanical connection, represented by the dashed line 21, under control of suitable recorder control circuits 22 of a kind, for example, as found in the above referred Offner strip chart recorder.

As shown in FIGURE 1 recorder control circuit 22 serves to manipulate leaf 17 thereby developing trace 19. Accordingly, assembly 16 provides means adapted to be selectively reading out the condition of the selected sources and recording manifestations representative of that condition to form an information or condition trace along a web.

Switch means serving to selectively operatively couple the read-out means to receive signals derived from one of several sources includes a deck of contacts 24 disposed to be scanned by an armature 26 under rotational movement of a selector knob 27 positionable to any one of three positions.

Means providing three sources of signals to be recorded by assembly 16 has been schematically represented in FIGURE 1 by the centrifuge rotor 28 formed with three cells 29 disposed to be scanned by suitable cell scanning apparatus. For example, such apparatus may be of a type as shown in the co-pending patent application of William R. Boyd, Ser. No. 452,681 assigned to the same assignee as herein. Thus, each contact 24 is respectively coupled to one of three leads 32 whereby selection of armature 26 feeds the signals from a selected one of the sources to recorder control circuit 22 for positioning assembly 16 accordingly.

Generally, a pulse forming means develops a train of pulses manifesting the occurrence of a series of "events" and is connected to drive a recorder in response thereto. The recorder normally lays down a train of spaced markers representative of the occurrence of each event so as to form an index trace 33 along web 11. Trace 33 is laterally disposed in relation to trace 19.

Thus, an event marker generator 34 produces a pulse train 36 by suitable means. Generator 34 may, for examle, be part of the scanning apparatus 31 and from such scanning apparatus derive, via line 37, signals indicative of the occurrence of an event scanned. The use of the term "event," therefore, as indicated above, refers to such occurrences as, for example, the optical sensing of one of cells 29 as it passes in front of a photo-responsive device. The term also refers, for example, to a clock-pulse generator of a type whereby the rotational position of a rotating element such as rotor 28 may be detected by sensing a scribe mark or several scribe marks formed thereon. An event may also be a time based signal generated by a pulse generator. The term should also be understood to include responses developed by a position transducer, for example.

Event marker generator 34 when turned "on" as by switch 38, feeds a pulse train 36 to amplifier 39. The output of amplifier 39 is fed via lead 41 to driver circuit 42.

The output from driver circuit 42 serves to operate an index trace recorder stylus assembly 43 in accordance with pulses applied to coil 44 mechanically coupled to stylus assembly 43, as represented by dashed line 46. Stylus assembly 43 is similar to the construction previously described relative to stylus assembly 16 and is operated in a similar manner. However, the normal output from driver circuit 42 when coupled to operate assembly 43 provides a series of discrete spaced recorded markers 47, the adjacent pairs of which are separated by gaps 48.

Recorder inhibiting means adapted to be operatively responsive to pulse train 36 serves to condition stylus assembly (43 via driver 42) to periodically inhibit formation of spacing, such as gaps 48 between markers 47 to form discrete identifiable configurations of markers such as the elongated indicia marker 49.

Accordingly, bistable means, such as a flip-flop 51, or other scale of two counting device is coupled via inverter and shaper circuits 52, 53 respectively to receive pulse train 36 via input 55, hereinafter referred to as point *v*. Each successive pulse of pulse train 36 applied at point *v* serves to switch flip-flop 51 from one stable state thereof to the opposite stable state. The output signals from flip-flop 51 appear on line 54 where they are amplified by amplifier 56 and applied via lead 57 to periodically control driver circuit 42. The output on line 54 from flip-flop 51 shall hereinafter be referred to as point *w*. This output, when amplified, serves to bias driver circuit 42 to a conducting condition notwithstanding the action of pulse train 36. Accordingly, whereas driver circuit 42 normally produces a pulse train corresponding to the input pulse train 36, the action of flip-flop 51 is coupled to the same pulse train 36 serves to periodically produce abnormal spacing in the output of driver 42.

A counter 58 comprised of a number of cascaded flip-flop circuits 59, 61, and, (to represent the possibility of incorporating additional flip-flops there is shown in dotted lines) a flip-flop 62 representative of any additional number of flip-flops which may be added if desired to employ larger numbers of signal sources.

Such flip-flop cascading procedures are, of course, well known and need not be further explained, except to note that each flip-flop represents a scale of two counter whereby two input pulses are required to produce one output signal.

In general, counter 58 is responsive to setting of selector knob 27 to a predetermined selected position related to a count of counter 58 indicative of a related one of the three sources of signals from scanner 31. After the count is reached, flip-flop 51 is precluded from further altering the normal operation of driver 42.

Upon attainment of predetermined selected count by counter 58, flip-flop 51 is precluded from attaining that stable state thereof which would otherwise serve to elongate the output pulses from driver circuit 42. Thus, so long as that particular stable state of flip-flop 51 remains unobtainable, it will be apparent that driver circuit 42 produces its normal output pulse train to the stylus assembly 43.

Briefly, a reset line 63 serves to apply a steady state reset signal to each of flip-flops 51, 59, 61, 62 upon the attainment of a selected predetermined count of counter 58.

Thus, the output of flip-flop 51 at point *w* is applied to the input of flip-flop 59 to change the stable state thereof. The output of flip-flop 59 appears at point *y* and, by lead 64 the output state of flip-flop 59 is sensed via an armature 66 ganged with armature 26, to apply the output state signal of flip-flop 59 to a reset circuit 67 which provides the steady state reset signal on line 63.

Therefore, circuit 67 is arranged whereby as the voltage at point *y* on line 64 goes positive it is sensed via armature 66 and line 68 by reset circuit 67 whereby the first of a pair of cascaded transistors 69, 71 of opposite conductivity type will be biased into conduction and the second transistor 71 will be cut off.

The collector circuit for transistor 71 includes a coil 72 whereby so long as transistor 71 remains properly biased to be conducting, a current will flow through coil 72. Coil 72 is connected by leads 73, 74 to respectively operate in a "pick and hold" fashion. Thus, lead 73 is adapted to be coupled to a suitable contact point within the equipment whereby at a point in the cycle of operation thereof it will receive and applied voltage whereby coil 72 will then become energized. One suitable contact point in the above referenced Offner equipment, for example, is provided by a contact point which is scanned once following initiation of operation of the equipment.

Having received this initial pulse on lead 73 the action of coil 72 is to transfer the switch armatures 76, 77 against the pull of a spring 78 whereby a steady state voltage is fed from lead 84 via armature 76 to maintain coil 72 conducting.

When the output state of flip-flop 59 at point *y* goes positive, transistor 69 will be turned "on" and transistor 71 will be cut off thereby de-energizing coil 72 so that spring 78 will shift armatures 76, 77 to a reset condition wherein line 63 becomes grounded. Line 63 remains grounded until coil 72 is again energized. This will occur after the equipment has been shut down and restarted or as otherwise provided depending upon the connections made to line 73. By grounding line 63 each flip-flop 51, 59, 61, 62 will be held in a reset condition whereby its output state will not change and be sensed at points *w*, *y* or *z*.

Counter 58 can count to two or to three as shown herein. Accordingly, it will be evident that the input pulse train at point *w* to flip-flop 59 will provide an output state at point *y* for every other pulse applied to flip-flop 59. Similarly flip-flop 61, fed by the output state at point *y* will develop an output signal at point *z* to be carried on line 79 for every two input pulses at point *y*. It will, therefore, be readily apparent that the voltage state at point *z* provides a count of two to be applied via armature 66 to reset circuit 67.

In order to count to three, the outputs from points *y* and *z* are combined by means of AND circuit 81 comprised of a pair of diodes 82 which are poled in conventional fashion in a manner whereby so long as one or the other of the outputs at *y* and *z* has not gone positive the voltage level on line 68 will remain at a lower of two levels so that transistor 71 continues to conduct and transistor 69 is cut off. Thus, both the outputs at *y* and *z* must be in a given pre-determined state in order to apply a positive signal to line 68 which can serve to de-energize coil 72.

In the foregoing arrangement, the various counting elements are arranged to respond to the negative going portion of signals applied thereto. Thus the chart of FIGURE 3 has been provided whereby operation of the apparatus can be explained as now to be described.

Briefly, the foregoing apparatus follows the steps of recording an information trace derived from one of a plurality of sources. An index trace is recorded laterally of the information trace and laid down in the form of a train of spaced index markers. To identify the sources, index markers and spacing therebetween are combined into an elongated marker a pre-determined number of times as related to the identity of the source selected. Thereafter, recording of additional index markers is resumed without further marker modification. Further as referred to below relative to another embodiment of the invention, the additional step may be included wherein each of the elongated markers is scribed to preserve identity of an index marker therein.

Assuming that switch 38 has been conditioned to its "on" position and that scanner 31 is arranged to commence operation to feed the signals from various sources, at a predetermined point in the cycle of the operation of the recorder or scanning apparatus a pulse will appear on line 73 to energize coil 72 via transistor 71, then in its conducting state. This action serves to transfer armatures 76, 77 to a holding position whereby a steady state voltage, applied via lead 84, holds coil 72 in its conducting condition.

Event marker generator 34 produces an amplified pulse train 36, the pulses of which are inverted by inverter 52 and fed via shaper 53 to point *y*.

Figure 3:
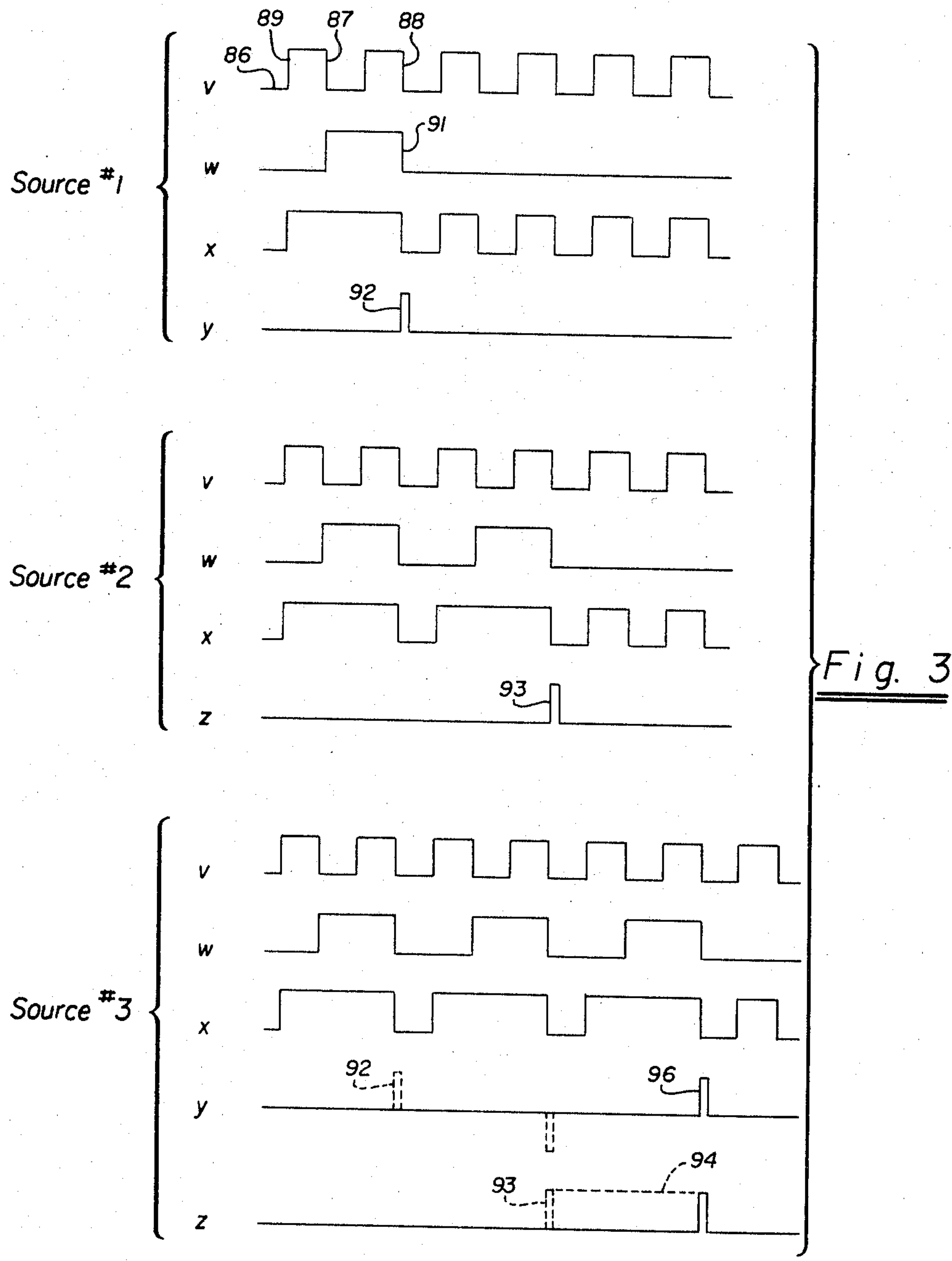
FIGURE 3 is a chart showing the relationships between conditions in the system at various points thereof to explain operation of the system.

Referring to the chart of FIGURE 3, and assuming that selector knob 27 has been positioned to select signals from the first source, the pulses at point *v* will appear as shown by the trace 86. As soon as the first negative going portion 87 appears at point *v* the condition of the output state at point *w* of flip-flop 51 will be switched positive. This condition will remain until the next negative going portion 88 of a pulse appears at input point *v*.

It is to be observed that the output of driver 42 at *x* will go positive upon arrival of the initial portion of pulses from pulse train 36 corresponding to that positive going portion 89 of signals at *v*. Thus, the output state at point *x* is initially conditioned positive by the arrival of pulses from pulse train 36 and is maintained positive by the output state of flip-flop 51 from point *w*.

As soon as point *w* goes negative (see portion 91 of FIGURE 3) so as to return flip-flop 51 to its initial stable state, the output of flip-flop 59 at *y* tends to go positive. This positive condition, represented by the short pulse 92 biases transistor 69 into conduction whereby transistor 71 is cut off so as to de-energize coil 72. Pulse 92, therefore, is of a duration determined by the time which is required to transfer the armatures 76, 77 to their reset state under action of spring 78 to ground line 63. Thereafter, further switching is inhibited.

When knob 27 is positioned to select signals from the second source, operation proceeds substantially as previously described but taking signals from the output *z* of flip-flop 61.

By positioning knob 27 to the third position, signals from the third source are fed via armature 26 to control the movement of stylus assembly 16. The index trace 33 will include initially three elongated indicia markers 49. The three indicia markers are derived substantially as above described taking into account the AND function of circuit 81.

Thus, by reference to FIGURE 3, pulse 92 does not occur in that position shown in dotted lines for *y* since it is precluded from forming by virtue of the negative state at point *z*, sensed through its associated diode 82. Pulse 93 representative of the output state of flip-flop 61 after a count of two has been reached likewise does not appear inasmuch as the condition of the output of flip-flop 59 at point *y* is negative. However, the output at point *z* of flip-flop 61 remains in condition to go positive as shown by the dotted line 94, at anytime that the output state at *y* becomes positive, as at 96. Thus, the state at *z* will become effective to apply a positive signal to line 83 at such time thereby resetting circuit 67.

In the foregoing preferred embodiment a pair of marker pulses and the spacing therebetween are combined to eliminate gaps between the markers of adjacent pair. The individual markers of each pair are thus formed into a single continuous elongated special indicia marker and the number of indicia markers identifies the selected source of signals then being recorded by stylus assembly 16.

In the process of so forming such indicia markers it will be apparent that the identity of the event markers may be lost. In certain instances it has been found desirable to manipulate stylus assembly 43 under control of means which serves to scribe each elongated indicia marker in a manner which preserves the normal index markings within each such elongated marker.

Thus, notwithstanding formation of the index markers into a single elongated continuous marker it remains possible to identify the point of occurrence of each such index marker point.

Figure 2:
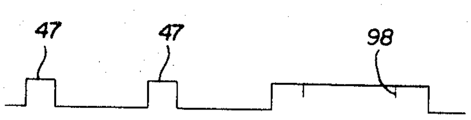
FIGURE 2 is a diagrammatic representation of an index trace comprised of markers according to another embodiment of the invention.

Accordingly as shown by the dashed line 97 a counteracting impulse effecting a delay, for example, or otherwise, is taken from point *v* and fed to amplifier 56 to permit driver circuit 42 to develop a momentary spike in its otherwise modified pulse train output. Referring to FIGURE 2 such spikes in the pulse train output of driver circuit 42 serve to scribe each elongated indicia marker, as at 98, so as to retain identity of the index markings which would otherwise occur by virtue of markers 47.

One suitable manner of introducing the counteracting impulse via line 97 can, for example, be accomplished by a resistive-capacitive differentiating network arranged to provide an impulse of voltage tending to counteract the initial portion (leading edge) of the inhibiting waveform on line 54 fed to amplifier 56. Thus, where the inhibit waveform on line 54 includes a positive-going leading edge, the counteracting waveform on line 97 would include a negative-going impulse serving to interrupt the inhibiting action on line 54. Only a single scribe mark would, therefore, be applied within the elongated marker.

What is claimed is:

1. A signal source indentification system for use with recorder apparatus of a type having means serving to provide a train of pulses representative of a series of events, index recording means operatively responsive to the last named means for recording a series of spaced markers indicative of said train pulses to define an index trace, and further having information recording means recording a trace associated with said index trace and indicative of conditions of a selected one of a plurality of sources, means for modifying said index trace to include indicia identifying the selected source, the last named means comprising first counting means operatively responsive to said train of pulses to apply periodic inhibit signals for successive short periods to said index recording means to inhibit formation of normal spacing between successive pulses of the train at such times to provide discrete periods of abnormally spaced markers serving as indicia, selector means serving to couple said information recording means to a selected one of said plural sources, second counting means settable to a predetermined selected count representative of said selected one of said plural sources, said first counting means being operatively responsive to attainment of said predetermined selected count by said counting means to preclude further generation of said inhibit signals, said first and second counting means being operatively coupled to limit the number of said short periods to a number associated with said selected count.

2. Apparatus according to claim 1 wherein said first counting means applies said inhibit signals to said index recording means to eliminate gaps between the markers of adjacent pairs thereof, the markers of each pair thereof forming a single continuous elongated indicia marker, the number of said indicia markers corresponding to said selected source to identify same.

3. Apparatus according to claim 2 further including means for moving said index recorder means in response to said pulse train to scribe each said indicia marker correspondingly to preserve normal index markings within each elongated indicia marker notwithstanding formation of the markers of said pairs into single elongated continuous indicia markers.

4. In apparatus of a type having read-out means adapted to be selectively coupled to each of a plurality of signal sources for selectively reading out the condition of the selected source and recording manifestations representative of said condition to form an information trace along a web, said apparatus being of a type further having pulse forming means providing a train of pulses manifesting the occurrence of a series of events and recorder means responsive thereto to normally record a train of spaced markers representative of their occurrence to form an index trace along the web in relation to said source trace, and further having switch means serving to selectively operatively couple said read-out means to receive signals derived from one of said plural sources, a system for identifying a selected one of said plural sources, said system comprising recorder inhibit means adapted to be operatively responsive to said train of pulses to condition the recorder means to periodically inhibit formation of spacing between markers to form discrete identifiable configurations of markers, and counting means responsive to said switch means settable to a predetermined selected count indicative of a related one of said source, said recorder inhibit means being operatively coupled to said counting means to respond to attainment of said predetermined selective count to preclude application of further inhibit signals to said recorder means thereby permitting continued normal formation of said markers thereafter.

5. In apparatus of a type having read-out means adapted to be selectively coupled to each of a plurality of signal sources for selectively reading out the condition of the selected source and recording manifestations representative of said condition to form an information trace along a web, said apparatus being of a type further having pulse forming means providing a train of pulses manifesting the occurrence of a series of events and recorder means responsive thereto to normally record a train of spaced markers representative of their occurrence to form an index trace along the web in relation to said source trace, and further having switch means serving to selectively operatively couple said read-out means to receive signals derived from one of said plural sources, a system for identifying a selected one of said plural sources, said system comprising bistable means adapted to be operatively responsive to pulses of said pulse forming means to change from one stable state to another and adapted to be operatively coupled to said recorder means in one stable state to inhibit formation of spacing between markers of said train of spaced markers, counting means responsive to said switch means settable to a predetermined selected count indicative of a related one of said sources, said bistable means being operatively coupled to said counting means to respond to attainment of said predetermined selected count and conditioned to inhibit attainment of said one stable state thereby permitting normal formation of said markers thereafter.

References Cited

UNITED STATES PATENTS 2,771,596 6/1950 Bellamy ---------- 340—177

RICHARD B. WILKINSON, *Primary Examiner.*

E. C. SIMMONS, *Assistant Examiner.*

U.S. Cl. X.R.

340—177